United States Patent
Tommy et al.

(10) Patent No.: US 10,242,500 B2
(45) Date of Patent: Mar. 26, 2019

(54) VIRTUAL REALITY BASED INTERACTIVE LEARNING

(71) Applicant: Tata Consultancy Services Limited, Mumbai (IN)

(72) Inventors: Robin Tommy, Trivandrum (IN); Hima Jose, Trivandrum (IN); Tejas Kawalkar, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 57 days.

(21) Appl. No.: 15/077,514

(22) Filed: Mar. 22, 2016

(65) Prior Publication Data
US 2017/0221267 A1 Aug. 3, 2017

(30) Foreign Application Priority Data
Jan. 29, 2016 (IN) .............................. 201621003340

(51) Int. Cl.
*G06T 19/00* (2011.01)
*G06F 3/01* (2006.01)
(Continued)

(52) U.S. Cl.
CPC .......... *G06T 19/006* (2013.01); *G06F 3/011* (2013.01); *G06T 15/00* (2013.01); *G09B 5/06* (2013.01);
(Continued)

(58) Field of Classification Search
CPC ....... G06T 19/006; G06F 3/011; A61B 3/113; A61B 5/16; A61B 5/742–5/745
See application file for complete search history.

(56) References Cited

U.S. PATENT DOCUMENTS

| | | |
|---|---|---|
| 2007/0134644 A1 | 6/2007 | Jones et al. |
| 2008/0020361 A1* | 1/2008 | Kron ...................... G09B 23/28 434/262 |

(Continued)

OTHER PUBLICATIONS

"Enhance Your World with Augmented Reality," *EON AR*™ (2013) 2 pages.

(Continued)

*Primary Examiner* — Diane M Wills
(74) *Attorney, Agent, or Firm* — Finnegan, Henderson, Farabow, Garrett & Dunner LLP

(57) ABSTRACT

A system and a method for virtual reality based interactive learning are provided. The method includes simulation of a 3D interactive scene in a VR environment, and rendering the 3D interactive scene including queries on a VR display platform. Responses to the queries are received in the VR environment. A first cumulative assessment score is computed based on the response and attributes of participants. Also, subsequent 3D interactive scenes are dynamically simulated in the VR environment based on the first cumulative assessment score. Subsequent queries associated with context of the subsequent scenes are rendered, and a second cumulative assessment score is computed based on the subsequent responses to the subsequent queries. Furthermore, an overall assessment score is computed based on the cumulative assessment scores. A 3D interactive scene is rendered till the overall assessment score is equal to or greater than a threshold assessment score.

13 Claims, 8 Drawing Sheets

(51) Int. Cl.
*G09B 5/06* (2006.01)
*G06T 15/00* (2011.01)
*G09B 5/12* (2006.01)
*G09B 7/06* (2006.01)

(52) U.S. Cl.
CPC ............ *G09B 5/125* (2013.01); *G09B 7/06* (2013.01); *G06T 2200/04* (2013.01)

(56) References Cited

U.S. PATENT DOCUMENTS

| | | | |
|---|---|---|---|
| 2009/0202964 A1* | 8/2009 | Simon | G06Q 10/10 434/62 |
| 2013/0203026 A1 | 8/2013 | Sundaresh et al. | |
| 2014/0272863 A1* | 9/2014 | Kim | G09B 23/28 434/262 |
| 2014/0315169 A1 | 10/2014 | Bohbot | |
| 2016/0314620 A1* | 10/2016 | Reilly | G09G 5/18 |
| 2017/0148214 A1* | 5/2017 | Muniz-Simas | G06T 19/006 |

OTHER PUBLICATIONS

Huang et al., English-language abstract of CN 104731343 (A), "Virtual reality man-machine interaction children education experience system based on mobile terminal," (Jun. 24, 2015).

* cited by examiner

VIRTUAL REALITY BASED INTERACTIVE LEARNING

PRIORITY CLAIM

This U.S. patent application claims priority 35 U.S.C. § 119 to: India Application No. 201621003340, filed on Jan. 29, 2016. The entire contents of the aforementioned application are incorporated herein by reference.

TECHNICAL FIELD

This disclosure relates generally to interactive learning, and, more particularly, to a method and system for interactive training and assessment for learning in a virtual reality (VR) environment.

BACKGROUND

Various modes of learning and assessment are adopted for training and enhancing skill set of candidates. Learning and assessment can be provided for various purposes such as equipping the candidates for a job, an examination, and other such activities. One of the most common modes of learning and assessment is classroom training where the potential candidates are expected to attend lectures imparted by instructors. Conventional systems also provide learning and assessment using computer resources, such as through online lectures, tutorial, and the like. Such online resources are provided over the internet by means of pre-stored lectures and/or online audios and/ video tutorials on a 2-dimensional or 3-dimensional platform.

The inventors here have recognized several technical problems with such conventional systems, as explained below. The conventional forms of learning and assessment are mostly focused on imparting theoretical learning. Moreover learning by way of conventional leaning systems is usually one-sided with primary focus on imparting the training in a prescribed manner, and the individual capabilities of the candidates engaged with such learning systems is not considered. Inventors understand that learning and assessment should be provided to the candidates in a manner that is both interactive and practical in nature, so as to equip the candidates as per their respective skill set and requirements.

SUMMARY

Embodiments of the present disclosure present technological improvements as solutions to one or more of the above-mentioned technical problems recognized by the inventors in conventional systems For example, in one embodiment, a computer implemented method for virtual reality based interactive learning is provided. The method can be executed by a hardware processor. The method includes simulating, at the hardware processor, a 3-dimensional (3D) interactive scene in a VR environment. The 3D interactive scene is representative of a real-world scene. Further, the method includes rendering the 3D interactive scene on a VR display platform of the VR environment. The 3D interactive scene further includes one or more queries associated with context of the 3D interactive scene. Furthermore, the method includes, receiving responses to the queries in the VR environment from the one or more participants of the VR environment. Subsequently, computing a first cumulative assessment score corresponding to the 3D interactive scene based on the responses and attributes of the participants. Further, the method includes, dynamically simulating subsequent 3D interactive scenes in the VR environment based on the first cumulative assessment score such that, the subsequent 3D interactive scenes comprise subsequent queries associated with context of the subsequent 3D interactive scenes. Moreover, difficulty level of the subsequent queries is different from a difficulty level of the queries. Subsequently the method includes, rendering the subsequent scenes comprising the subsequent queries on the VR display platform to receive one or more subsequent responses from the participants. A second cumulative assessment score is computed based on the subsequent responses and the attributes of the participants. Further, an overall assessment score is computed based on the first cumulative assessment score, the second cumulative assessment score and cumulative assessment scores of the subsequent 3D interactive scenes. The subsequent 3D interactive scenes are rendered until the overall assessment score is less than a threshold assessment score. The threshold assessment score is indicative of the learning.

In another embodiment, computer-implemented system for virtual reality based interactive virtual learning is provided. The system includes a memory, and a hardware processor. The memory stores instructions and a repository. The repository includes simulation data and attributes of participants of the VR environment. The hardware processor may include a processor. The memory is coupled to the processor, such that the processor is configured by the said instructions stored in the memory to simulate a 3D interactive scene in the VR environment based on the simulation data at a computing device. The VR environment is accessible from a plurality of remote servers communicably coupled to the computing device. Further, the system is caused to simulate, at the computing device, a 3D interactive scene within a VR environment upon selection of the at least 3D interactive scene by one or more participants from a plurality of 3D interactive scenes. Furthermore, the system is caused to enable, at the computing device, to generate one or more queries in the 3D interactive scene. Moreover, the system is caused to compute an overall assessment score, in real-time, based on the responses to the queries provided by the participants in the 3D interactive scene. The overall assessment score and threshold assessment score are indicative of learning of the participants.

In yet another embodiment, a non-transitory computer-readable medium having embodied thereon a computer program for executing a method for virtual reality based interactive learning is provided. The method includes facilitating, at a computing device, simulation of a 3D interactive scene within a VR environment. The 3D interactive scene is representative of a real-world scene. Further, the method includes, rendering the 3D interactive scene on a VR display platform of the VR environment. The 3D interactive scene further includes one or more queries associated with context of the 3D interactive scene. Furthermore, the method includes, receiving responses to the queries in the VR environment from participants of the VR environment. Subsequently, computing a first cumulative assessment score corresponding to the 3D interactive scene based on the responses and attributes of the participants. Further, the method includes, dynamically simulating subsequent 3D interactive scenes in the VR environment based on the first cumulative assessment score such that, the subsequent 3D interactive scenes comprise subsequent queries associated with context of the subsequent 3D interactive scenes. Moreover, difficulty level of the subsequent queries is different from a difficulty level of the queries. Subsequently, the method includes, rendering the subsequent scenes comprising the subsequent queries on the VR display platform to receive subsequent responses from the participants. A second cumulative assessment score is computed based on the subsequent responses and the attributes of the participants. Further, an overall assessment score is computed based on the first cumulative assessment score, the second cumulative assessment score of the 3D interactive scene and cumulative assessment scores of the subsequent 3D interactive scenes. The subsequent 3D interactive scenes are rendered until the overall assessment score is less than a threshold assessment score. The threshold assessment score is indicative of the learning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
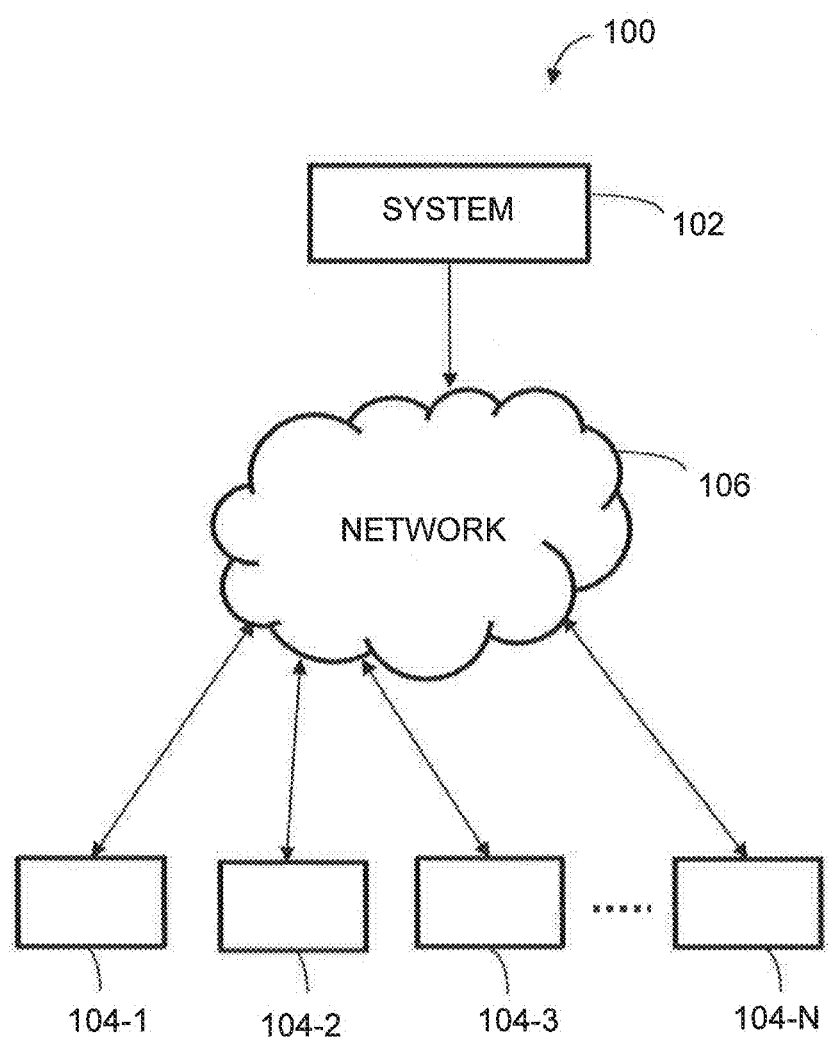
FIG. 1 illustrates a network implementation for virtual reality based interactive learning, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Unless specifically stated otherwise as apparent from the following discussions, it is to be appreciated that throughout the present disclosure, discussions utilizing terms such as "determining" or "generating" or "comparing" or the like, refer to the action and processes of a computer system, or similar electronic activity detection device, that manipulates and transforms data represented as physical (electronic) quantities within the computer system's registers and memories into other data similarly represented as physical quantities within the computer system memories or registers or other such information storage, transmission or display devices.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The embodiments herein provide a system and method to enable VR based interactive learning focused on education and training. For example, the disclosed system enables participation in various example scenarios such as, gaining driving and traffic awareness in a virtual reality environment, product demonstration, product interaction, learning in virtual space and virtual world examination and assessments, and so on and so forth. It will be noted herein that the above example scenarios are only illustrative, and included herein for the purpose of clarity of the embodiments. The disclosed method and system are not limited to the cited example scenarios and can be included in a variety of applications and scenarios without departing from the scope of the embodiments. Referring now to the drawings, and more particularly to FIGS. 1 through 6C, where similar reference characters denote corresponding features consistently throughout the figures, there are shown preferred embodiments and these embodiments are described in the context of the following exemplary system and/or method.

The purpose of training is to bridge the gap between individual's current skill-set and expected requirements such as job demands, examination assessment, and so on. Most trainings are theoretical in nature. Training in a VR environment provides practical and real life experience to the participant at the participant's convenience. Herein the term 'VR environment' refers to an artificial environment that is simulated with requisite software, where such artificial environment replicates an environment or a real-world scene. The VR environment simulated by the VR software is presented to a user in a manner that the user accepts the presented environments as a real-world environment of the real-world scene. The user(s) of the VR environment may hereinafter be referred to as participant(s) of the VR environment.

Various embodiments disclosed herein provides methods and system for imparting training and assessment in the VR environment for individual candidates or groups of candidates (or participants), thereby achieving fast learning in less time. For instance, the disclosed system enables the participants of the VR environment to undergo task-based sequential learning by enabling dynamic availability of requisite training content (anytime anywhere access) as per the participant's requirements and dynamic assessment of the learning of the training content within the VR environment. The system is implemented in a network based environment to enable the dynamic availability of the requisite training content and dynamic assessment of the learning within the VR environment. An example of a VR based interactive learning is described further with reference to FIG. 1.

FIG. 1 illustrates a network implementation 100 for VR based interactive learning, in accordance with an embodiment of the present subject matter. The network implementation 100 is shown to include a system 102 which can be implemented in one or more computing devices, devices such as devices 104-1, 104-2 . . . 104-N, and a communication network 106 for facilitating communication between the system 102 and the user devices 104-1, 104-2 . . . 104-N. In one embodiment, the system 102 facilitates common platform for virtual reality based learning environment. Although the present subject matter is explained considering that the system 102 is implemented as a software application on a server, it may be understood that the system 102 may also be implemented as a variety of computing platforms, such as Android®, iOS®, Symbian®, Windows®, Blackberry®, and the like. In one implementation, the system 102 may be implemented in a cloud-based environment. It will be understood that the system 102 may be accessed by multiple users through the one or more devices 104-1, 104-2 . . . 104-N, collectively referred to as devices 104 hereinafter, or applications residing on the devices 104. Examples of the devices 104 may include, but are not limited to, a portable computer, a personal digital assistant, a handheld device, and a workstation mobile headset, and the like. Herein multiple users may include students, trainees, and any participant of the VR environment.

In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an embodiment, the devices 104 may communicate with one another to enable interaction amongst a plurality of participants in the VR environment, and such communication and interaction between the plurality of participants may be controlled by a system 102, which can be implemented in one or more computing devices. Herein, the term 'interaction' refers to collaboration between the plurality of participants in the VR environment to respond to queries. For example, a plurality of participants may select a 'training on traffic rules' scene in the VR environment, and the participants may collaborate with each other while responding to the queries that may be rendered along with a 3D interactive scene that is presented in the context of 'training on traffic rules'. In order to conduct training and assessment in a VR environment, a high level of automation is required for provisioning of resources to multiple trainees or participants. A key feature of the system 102 is the VR environment which includes a plurality of interactive scenes and a plurality of queries which are made available to the participant devices for instance the devices 104.

As noted, the VR environment 100 may serve one or more participants of the VR environment 100 with associated devices, e.g., devices 104. The VR environment 100 may also be accessed by other types of clients, such as administrators. Accordingly, the VR environment 100 may enable different types of services and/or applications depending on an access level of the particular client. For instance, a trainee/participant may have access to training data stored in various devices such as devices 104 while the administrator may have access to storage and data analysis services of the VR environment. A detailed VR environment for learning, and assessment is described further with reference to FIG. 2. The VR environment with interactive scenes can be accessed by the participants anywhere anytime, thereby resulting in faster learning. An example of a system embodied in the computing device (for example, the device 102 of FIG. 1) for provisioning of the virtual reality training is described further with reference to FIG. 2.

Figure 2:
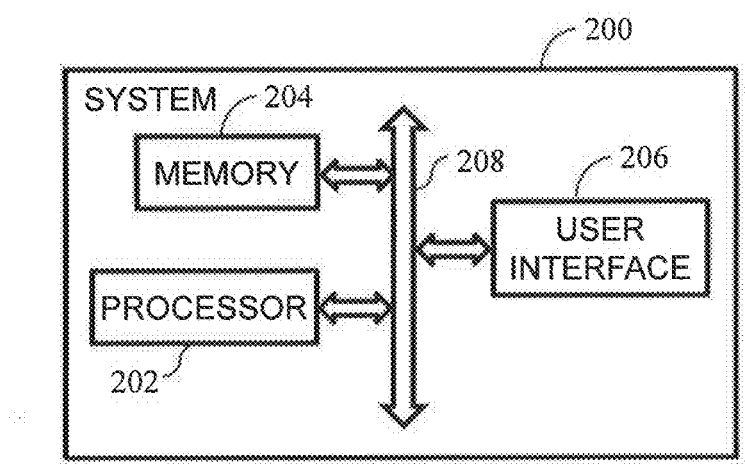
FIG. 2 illustrates a block diagram of a system for virtual reality based interactive learning, in accordance with an embodiment.

FIG. 2 illustrates a system 200 for VR based interactive learning, according to an embodiment of present disclosure. In an embodiment, the system 200 may be embodied or executed in a computing device, for instance the computing device 102 (FIG. 1). Alternatively, the system 200 may be a distributed system distributed in a plurality of computing devices associated with the VR environment. The system 200 includes or is otherwise in communication with at least one hardware processor such as a processor 202, at least one memory such as a memory 204, and a user interface 206. The processor 202, memory 204, and the user interface 206 may be coupled by a system bus such as a system bus 208 or a similar mechanism.

In an embodiment, the processor 202 may include circuitry implementing, among others, audio and logic functions associated with the communication. For example, the processor 204 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 204 may include, among other things, a clock, an arithmetic logic unit (ALU) and logic gates configured to support operation of the processor 202. Further, the processor 204 may include functionality to execute one or more software programs, which may be stored in the memory 204 or otherwise accessible to the processor 202.

The at least one memory such as a memory 204, may store any number of pieces of information, and data, used by the system to implement the functions of the system 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the call control server to carry out various functions in accordance with various example embodiments. Additionally or alternatively, the memory 204 may be configured to store instructions which when executed by the processor 202 causes the system 200 to behave in a manner as described in various embodiments.

In an example embodiment, a user interface 206 may be in communication with the processor 202. Examples of the user interface 206 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like.

In an embodiment, the user interface 206 is implemented in a VR display platform. In this regard, the processor 202 may include user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an embodiment, a set of instructions are used in the processing of functionalities of the system 200. The set of instructions may be in the form of a program or software. The software may be in the form of system software or application software. The virtual reality based interactive learning system 200, may be facilitated through a computer implemented application available over a network such as the Internet.

In an embodiment, for performing the functionalities associated with VR environment based learning (described with reference to FIGS. 1 to 6C), the memory 204 of the system 200 may include multiple modules or software programs that may be executed by the processor 202. For instance, the memory 204 may include a repository having modules of simulation data having a plurality of interactive scenes and a plurality of queries associated with the interactive scenes and so on. The repository may also store all the information regarding the participant including behavioral attributes of participants. Herein, the behavioral attributes of the participants may be inclusive of past-knowledge, performance parameters and the like.

In an example embodiment, the processor 202 is configured to, with the content of the memory 204, and optionally with other components described herein, to cause the system 200 to access the VR environment using an internet gateway. In another embodiment, the one or more devices may access the VR environment over an enterprise private cloud or learning datacentre network. Herein, the one or more devices may be assumed to include a client device, such as a mobile phone, a laptop, a personal digital assistant (PDA), a computer, and so on. The device may communicate with a web portal for accessing the VR environment. In an embodiment, the processor 202 is configured to, with the content of the memory 204, and optionally with other components described herein, to cause the system 200 to enable simulation of interactive scenes within the VR environment. In an embodiment, upon enabling a participant to select an interactive scene for the training, the system 200 may facilitate in simulating an interactive scene within the VR environment. For instance, upon triggering of a request to access an interactive scene, the system 200 may be caused to simulate the interactive scene and present queries on the VR display platform. The VR display platform enables the one or more participants to access the interactive scene and the queries. The interactive experience in the VR environment may implement graphic imaging, audio sampling, or other technology to provide an interactive life-like environment.

In an embodiment, the processor 202 is configured to simulate a 3D interactive scene within the VR environment. Each VR environment includes one or more 3D interactive levels or scenes for one or more participants to interact with. Each level or scene can be representative of a knowledge level of the participant. For instance, the 3D interactive scene can be related to a 'traffic rules learning scenario'. In such a case, a first level of may include a scene associated with basic traffic rules, in case the system determines that the participant of the scene is a foreigner and may not be aware of even the basic traffic rules or in case the participant The processor 202 is caused to enable the participant to select a 3D interactive scene in the VR environment. The processor 202 is further caused to simulate the 3D interactive scene within the VR environment based on the selection. The participant interacts with various elements in the 3D interactive scene simulated by the processor 202. The elements in the 3D interactive scene may include multiple images, figures and the like with which the participants can interact through movements, gestures or eye tracking. In an instance, the participant may be enabled to drive a vehicle within the VR environment through hand movements and eye tracking. Based on the participant interaction, the processor 202 is caused to present one or more queries associated with context of the 3D interactive scene to the participant within the 3D interactive scene. Herein, the 'context' of the interactive scene pertains to the subject matter of the rendered scene. For example, based on a selection of the participant, a 3D interactive scene pertaining to 'training of traffic rules' is rendered. The rendered scene can be a basic level scene and accordingly the queries included in the rendered scene can be pertaining to the basic traffic rules, and not advanced traffic rules. However, in case the rendered scene is an advanced level scene, then the queries included in the scene can be according to the context of the scene, meaning thereby that the queries can be related to advanced traffic rules. The participant may provide responses to the queries. In an embodiment the participant may provide the response by means of the user interface 206 on the VR display platform. The processor 202 receives the responses to the queries presented to the participant within the 3D interactive scene. The processor 202 is caused to perform an assessment of the responses provided by the participant to compute a first cumulative assessment score. The first cumulative assessment score provides an indication of knowledge and learning of the participant. In an embodiment, the first cumulative assessment score is computed based on the one or more responses and the one or more attributes of the participant. Herein, the term 'cumulative' denotes that each 3D interactive scene can include a multiple queries, and the assessment score corresponding to said 3D interactive scene/level is computed based on the cumulative responses corresponding to all the queries said scene/level. The assessment scores of the participants may also be stored in the memory. In an embodiment, the one or more attributes of the participant includes performance parameters, past-knowledge and learning of the participant.

The processor 202 is caused to dynamically simulate one or more subsequent 3D interactive scenes based on the first cumulative assessment score of the participant. For example, in an example scenario, it may be determined based on the cumulative score that the participant has not performed well in the first level. In this embodiment, the processor 202 may be configured to dynamically simulate a subsequent 3D interactive scene having context that is preliminary to the context of the 3D interactive scene. In an embodiment, the processor 202 can dynamically simulate the subsequent 3D interactive scenes by utilizing the simulation data.

In an embodiment, the processor 202 is caused to render the one or more subsequent 3D interactive scenes on the VR display platform. In an embodiment, the subsequent 3D interactive scenes include one or more subsequent queries such that a difficulty level of the one or more subsequent queries is different from a difficulty level of the one or more queries presented in the interactive 3D scene presented earlier to the participant. In an embodiment, the difficulty level of the queries presented to the user may be more than the difficulty level of the queries previously presented. In another embodiment, the difficulty level of the queries presented to the user may be less than the difficulty level of the queries previously presented. For example, in a scenario where the first cumulative assessment score is less than an expected value of threshold score for that level/scene, the processor can simulate a subsequent 3D interactive scene having queries that have difficulty level lesser than the difficulty level of the queries of the 3D interactive scene. In another example scenario, where the first cumulative assessment score is more than or equal to the expected value of threshold assessment score for that level/scene, the processor can simulate a subsequent 3D interactive scene having queries that have difficulty level more than the difficulty level of the queries of the 3D interactive scene. Herein, it will be understood the processor 202 may assign a threshold assessment score to each 3D interactive scene/level, such that the value of threshold assessment score is indicative of the learning associated with said 3D interactive scene/level.

In an embodiment, the system 200 is caused to receive one or more subsequent responses to the subsequent queries presented to the participant in the subsequent 3D interactives scene. In an embodiment, the participant may provide the one or more subsequent responses by utilizing the UI 206. The processor 202 is caused to compute a second cumulative assessment score based on the subsequent responses. In an embodiment, the second cumulative assessment score may be indicative of the learning and/or performance in the subsequent scene. In an embodiment, the system 200 is caused to determine whether to present another subsequent scene with further subsequent queries to the participant based on the second cumulative score. The system 200 may further be caused to simulate the subsequent scene that can be presented based on the second cumulative score. In an embodiment, the system 200 may utilize the simulation data to simulate the subsequent scene. Herein, it will be noted that the terms 'first cumulative assessment score' and 'second cumulative assessment score' are used to differentiate between the cumulative assessment scores computed for two different levels/scenes (for example, 3D interactive scene and subsequent 3D interactive scene), and in no way should be construed as limiting to the embodiments of the disclosure. It will also be noted that the term 'second cumulative assessment score' is used in context of cumulative assessment score of subsequent scenes. For example, fours scene are sequentially simulated and rendered on the VR display platform based on the cumulative assessment scores of each of the respective scenes. For instance, the cumulative assessment scores for Scene 1, Scene 2, and Scene 3 may be score 1, score 2, and score 3, respectively. In the present description, it is assumed that when subsequent to scene 1, scene 2 is rendered, then the cumulative assessment score of the Scene 1 is referred to as first cumulative assessment score and the cumulative assessment score of the Scene 2 is referred to as second cumulative assessment score. Now, when subsequent to scene 2, scene 3 is rendered, then the cumulative assessment score of the Scene 2 is referred to as first assessment score and the cumulative assessment score of the Scene 3 is referred to as second assessment score.

In an embodiment, the processor 202 is caused to compute a cumulative assessment score for every subsequent 3D interactive scene. The processor 202 is further caused to compute an overall assessment score based on the cumulative assessment score of each of the 3D interactive scenes, such that the overall assessment score is an aggregate of all the cumulative assessment scores of the 3D interactive scenes. Further, the one or more subsequent 3D interactive scenes are rendered to the participant till the overall assessment score is equal to or greater than a threshold assessment score. The threshold assessment score is pre-defined, so as to determine whether the participant has acquired requisite knowledge in a domain presented in the VR environment.

In an embodiment, the system 200 may include software modules stored in memory 204 and executed by the processor 202 that allow participants to customize the virtual environment. For example, participants may select avatars to represent themselves within the VR environment. The participants may select a particular region, country, or language in which the learning experience can be conducted.

In an embodiment the system 200, may be implemented in a plurality of training scenarios such as driving and traffic awareness training management, product demonstrations which include product interaction and learning in VR environment and virtual world training and assessment.

In another embodiment, the system 300 may be configured by instructions to enable interaction between a plurality of participants within the VR environment. The plurality of participants provide responses to the one or more queries and to the one or more subsequent queries presented in the various 3D interactive scenes. An assessment score is computed based on the individual responses of the plurality of participants and the responses based on the interaction amongst the plurality of participants.

In another embodiment, the system 200, determines the difficulty levels of the one or more queries presented to the participants. Each query presented to the participants is given a rating from 0 to 10. In an instance, if a particular query is answered correctly by multiple participants in a 3D interactive scene within the VR environment, the system 300 gives the query a high rating in the range of 5 to 10. Any query which gets a rating of 10 is considered to have a very low difficulty level as the query was previously answered correctly by every participant. The query with a rating of 10 is no longer rendered to any of the participants in a 3D interactive scene within the VR environment.

In an embodiment, various external systems may also communicate with the VR based learning system. Such systems may include social networking systems, learning management systems, or other systems.

Participants may access the VR based interactive learning system through one or more mobile devices. The one or more mobile devices may include various known mobile computing devices, which also may be referenced as handheld devices, handheld computers or simply handhelds. These may be pocket-sized computing devices, typically having a display screen with touch input and/or a miniature keyboard. The mobile devices may also be or include iPhones, iPads, smart phones, laptops, netbooks, e-readers, tablet computers, or other devices. Typically these devices are also equipped with cameras or other imaging devices. The one or more mobile devices may be used in conjunction with one or more VR display devices.

Figure 3:
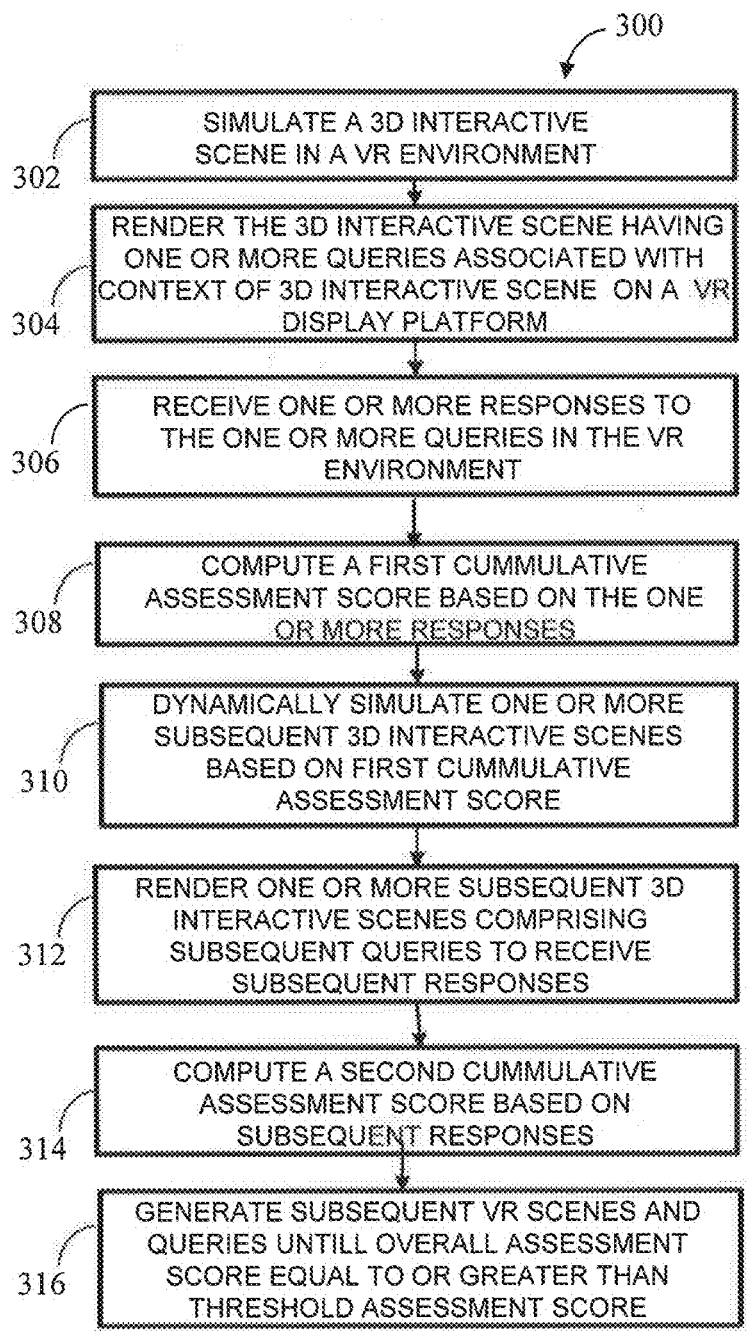
FIG. 3 illustrates a process flow of method for virtual reality based interactive learning, in accordance with an embodiment.

FIG. 3 illustrates a process flow of method 300 for virtual reality based interactive learning, in accordance with an embodiment. In an embodiment, the method 300 for virtual reality based interactive learning can be implemented at a system, for example, the system 200 (FIG. 2).

At step 302 of method 300, a 3D interactive scene is simulated in a VR environment. The 3D interactive scene in the VR environment is simulated based on at least one simulation data. The simulation data includes a plurality of 3D interactive scenes and a plurality of queries. Herein, the queries may include multiple choice questions, true or false questions, rate-assignment questions, or in any form, without limiting to conventional types of queries. The participants may respond to the queries in the VR environment through movements, gesture or eye tracking. In an embodiment, the 3D interactive scene is simulated upon receiving a request. For example, a participant of the VR environment may request by selecting the 3D interactive scene on the VR display platform of the system 200.

At 304, the 3D interactive scene is rendered on a VR display platform in the VR environment. In an embodiment, a VR display platform may include virtual elements, including, but not limited to VR goggles, optical projectors, holographic imaging, and so on. The 3D interactive scene including one or more queries are associated with context of the 3D interactive scene. Herein, the 'context' of the interactive scene pertains to the subject matter of the rendered scene. For example, based on a selection of the participant, a 3D) interactive scene pertaining to 'training of traffic rules' is rendered. The rendered scene can be a basic level scene and accordingly the queries included in the rendered scene can be pertaining to the basic traffic rules, and not advanced traffic rules. However, in case the rendered scene is an advanced level scene, then the queries included in the scene can be according to the context of the scene, meaning thereby that the queries can be related to advanced traffic rules.

At 306, one or more responses to the one or more queries are received. In an embodiment, the one or more responses are received from the participant(s) of the 3D interactive scene. In an embodiment, the participants may provide the response through a user interface, for example UI 206 of the system 200. In one embodiment, the user interface may capture the response of the participant through movements or gestures or eye tracking of the participant(s).

At 308, a first cumulative assessment score is computed based at least on the responses of the participant to the one or more queries within the 3D interactive scene. In an embodiment, the first cumulative assessment score is also computed based on one or more attributes of the participants. In an embodiment, the one or more attributes of the participants can be stored in a repository, such that the one or more attributes of the participant are indicative of one or more performance parameters, past-knowledge and learning of the participant. Herein, the performance parameters of the participant may be indicative of the performance of the participant in responding to the queries. For instance, the performance parameters may include promptness in responding to queries (this can be measured based on the time taken to respond), correctness of the response (this can be measured based on a determination whether the responses are correct or wrong), and so on. The past knowledge of the participant may include information regarding the knowledge acquired previously by the participant. The past knowledge of the participant can be pre-stored in the repository with profile information of the participant. For example, the profile information of the participant may include an information that the participant is proficient in driving two-wheeler, and accordingly the system may assume the participant to understand basic traffic rules. In such an instance, the queries presented to the participant with the first/basic scene can be of advanced nature as compared to the queries that may be presented to a participant who is not proficient in traffic rules at all. Moreover, the computation of the cumulative score may also be performed based on a determination of said past-knowledge.

At 310, subsequent 3D interactive scenes are dynamically simulated in the VR environment based on the first cumulative assessment score. At 312, one or more subsequent queries associated with context of the subsequent 3D interactive scenes are rendered, such that a difficulty level of the one or more subsequent queries is different from a difficulty level of the one or more queries. In an embodiment, the difficulty level of subsequent queries (in the subsequent scene) is based on the assessment score of the queries (presented with the scene). In an embodiment, responses of the participant to the subsequent 3D interactive scenes comprising the one or more subsequent queries in the VR environment are received through the user interface.

At 314, a second cumulative assessment score is computed based on the responses of the participant to all the queries presented to the participant in the subsequent 3D interactive scenes in the VR environment. A cumulative assessment score is calculated for each of the 3D interactive scenes. An overall assessment score is calculated at 316 based on the cumulative assessment score of each of the 3D interactive scenes, such that the overall assessment score is an aggregate of all the cumulative assessment scores of the 3D interactive scenes. In an example embodiment, the overall assessment score can be computed based on a weighted average of cumulative assessment scores of all the levels or the scenes presented to the participants, such that the weights assigned to the cumulative assessment score of each of the scene is in accordance with a level of the scene. For example, the weights assigned to the scenes associated with the advanced levels may be more than the weights assigned to the scenes associated with the basic levels.

In an embodiment, the threshold assessment score can be pre-defined, so as to determine whether the participant has acquired requisite knowledge in a domain presented in the VR environment. If the overall assessment score of the participant is equal to or above the threshold assessment score, it is determined that the participant has the requisite knowledge in the particular domain. Whereas, if the overall assessment score is less than the threshold assessment score it is assessed that the participant does not have the requisite knowledge in the particular domain. The participant is presented with subsequent 3D interactive scenes and subsequent one or more queries till the time the overall assessment score of the participant is equal to or greater than the threshold assessment score.

In an alternative embodiment, the threshold assessment score can be dynamically updated based on the performance of a plurality of participants over a period of time. For example, the performance of the plurality of participants can be monitored over a period of time, and from there it can be determined that most of the participants are scoring below the threshold assessment score. From this scenario, it may be assumed that the queries may be difficult as compared to the average knowledge of the participants even though the participants are conversant in such areas (for which participant has engaged with the VR environment). On such determination, the system may automatically lower the value of the threshold assessment score to an optimum value, and thereafter again continue to monitor the performance of the plurality of participants over a period of time.

The interaction of the one or more participants with the 3D interactive scene and the one or more subsequent 3D interactive scenes to respond to the one or more queries and the one more subsequent queries facilitate in learning.

In an embodiment, the participant may elect to end or pause a learning process in the 3D interactive scene on the VR display platform. After the participant ends or pauses the learning process, an assessment score is presented to the participant. Also, the participant may "save" or store the place they last visited so that the participant can return to complete an unfinished query or be able to repeat a 3D interactive scene. The details of the unfinished learning process of the participant are stored in the repository.

Figure 4:
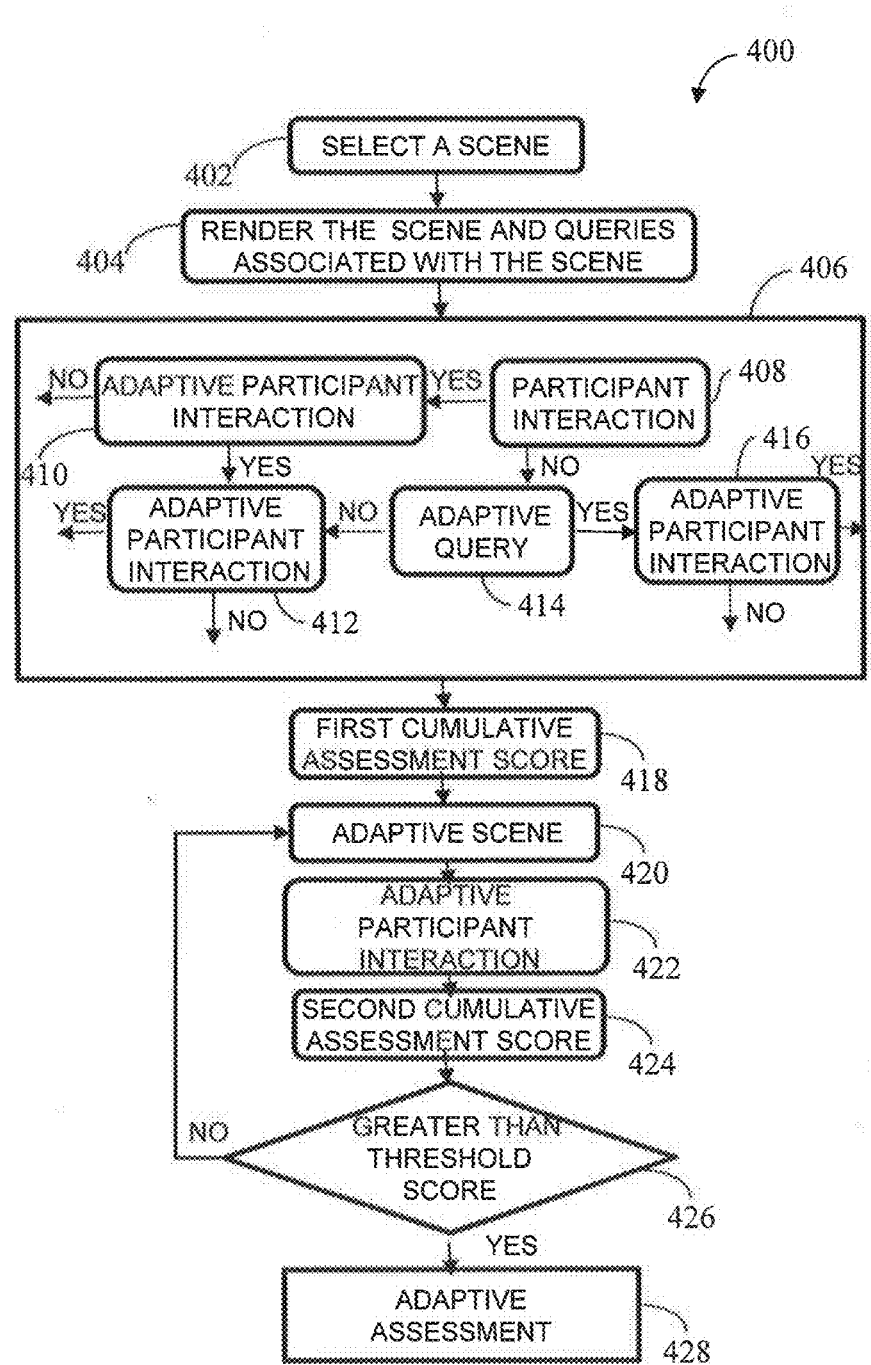
FIG. 4 illustrates a process flow of virtual reality based interactive learning, in accordance with an example embodiment.

FIG. 4 illustrates a process flow 400 of virtual reality based learning, according to an embodiment of the present disclosure. In an embodiment, the process 400 may be embodied or executed in a system, for instance the system 102 (FIG. 1). At 402, a participant can select a 3D interactive scene (scene). At 404, the scene and queries associated with context of the scene are rendered on the VR display of the system, and are presented to the participant. In an embodiment, the system is configured to dynamically select the queries from a plurality of queries stored in the repository corresponding to the scene. For example, the system may present a query associated with the context of the scene to the participant, and the user may provide a response to said query. Now, the system may select a subsequent query associated with the context of the scene based on the participant's response to the previous query. Herein, the selection of subsequent query based on the response of the previous query is adaptive in nature, and hence, such interaction of the participant with the VR system may be termed as 'adaptive participant interaction', and the queries rendered on the VR display platform may be referred to as 'adaptive queries'. In an embodiment, the system may be configured to render a plurality of adaptive queries on the VR display platform, and compute a cumulative score based at least on the responses provided by the participant (to said adaptive queries) during the adaptive interaction. A method for adaptive participant interaction is shown at 406.

The method at 406 includes 408-416 for adaptive participant interaction. At 408, the participant interacts with the 3D interactive scene to respond to the queries. As the participant interacts with the 3D interactive scene, there are changes in the 3D interactive scene to which there is adaptive participant interaction at 410. Based on participant interaction an adaptive query is presented to the participant at 414. If there is no participant interaction an adaptive query is still presented to the participant at 414. There is an adaptive participant interaction within the 3D interactive scene in the form of responses to the adaptive queries at 412 and at 416.

At 418, based on the responses of the participant to all the adaptive queries, a first cumulative assessment score is computed. Further, an adaptive scene is presented to the participant based on the first cumulative assessment score at 420. At 422, there is adaptive participant interaction to the adaptive scene presented to the participant at 420. More adaptive queries are presented to the participant within the adaptive scene and a second cumulative assessment score is computed at 424, based on the responses of the participant to the adaptive queries presented within the adaptive scene. At 426, a threshold assessment score is predefined and the second cumulative assessment score is compared with the threshold assessment score. If the second cumulative assessment score is less than the threshold assessment score, the participant is presented with another adaptive scene and adaptive queries at 420. If the second cumulative assessment score is greater or equal to the threshold assessment score an adaptive assessment is carried out by the system 102, at 428.

In an embodiment, the second cumulative assessment score may be indicative of the learning and/or performance in the adaptive scene. Herein, it will be noted that the terms 'first cumulative assessment score' and 'second cumulative assessment score' are used to differentiate between the cumulative assessment scores computed for two different scenes (for example, 3D interactive scene and adaptive 3D interactive scene), and in no way should be construed as limiting to the embodiments of the disclosure. It will also be noted that the term 'second cumulative assessment score' is used in context of cumulative assessment score of subsequent adaptive scenes. For example, fours scene are sequentially simulated and rendered on the VR display platform based on the cumulative assessment scores of each of the respective scenes. For instance, the cumulative assessment scores for Scene 1, Scene 2, and Scene 3 may be score 1, score 2, and score 3, respectively. In the present description, it is assumed that when subsequent to scene 1, scene 2 is rendered, then the cumulative assessment score of the Scene 1 is referred to as first cumulative assessment score and the cumulative assessment score of the Scene 2 is referred to as second cumulative assessment score. Now, when subsequent to scene 2, scene 3 is rendered, then the cumulative assessment score of the Scene 2 is referred to as first cumulative assessment score and the cumulative assessment score of the Scene 3 is referred to as cumulative second assessment score. Based on the first cumulative assessment score, a subsequent scene is adaptively simulated at 420. Herein, the term 'adaptively simulated' refers to simulation of the subsequent scene based on the participant interaction with the first scene.

As explained above, the system 102 simulates and presents adaptive scenes having adaptive queries to the participants of the VR environment, thereby imparting a systematic learning experience to the participants.

The process 400 provides a dynamic learning environment by adapting to the participant responses. An adaptive assessment is performed based on the participant's response to the adaptive queries. Herein, a dynamic scene management is enabled by the system such that various 3D interactive scenes are adaptively presented to the participant based on the participant responses. It will be noted that in various embodiments, the participant's responses, participant's attributes and adaptive assessment scores are stored in the repository of the system. An example embodiment, of implementation of virtual reality based learning on a VR display device is illustrated in FIG. 5.

Figure 5:
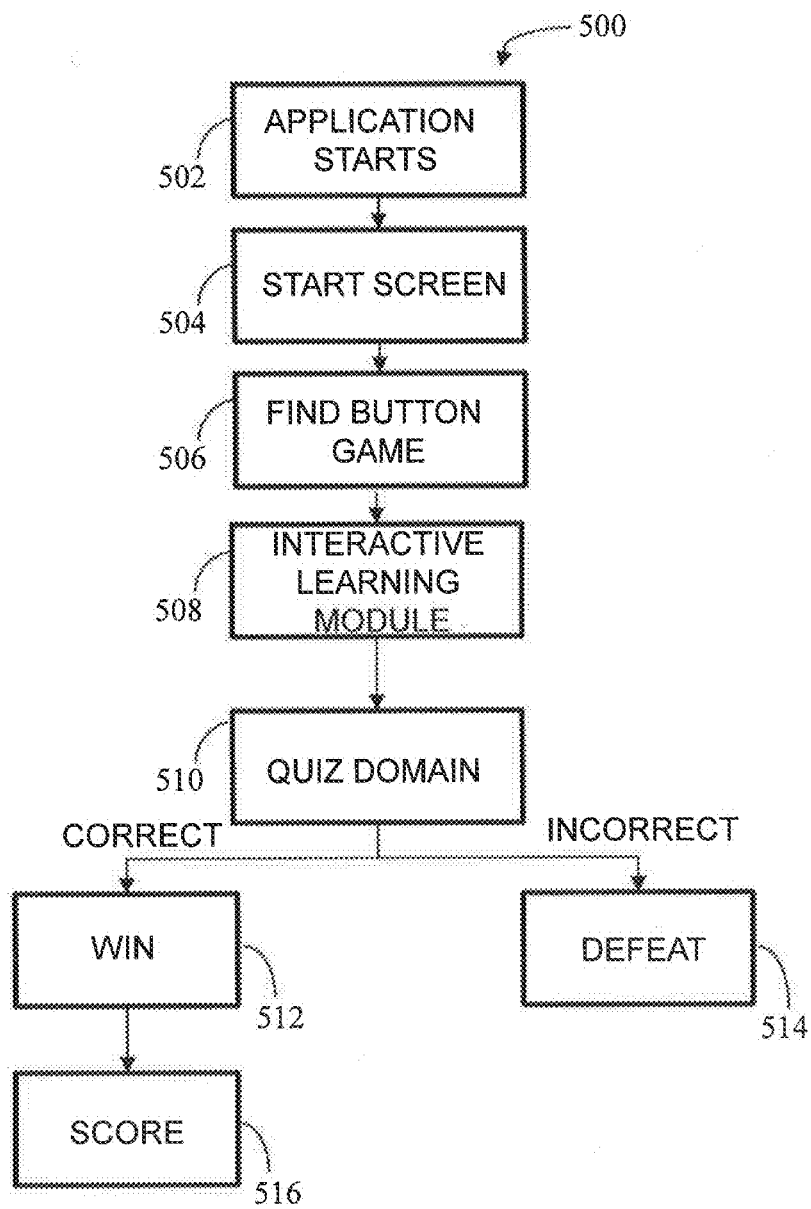
FIG. 5 illustrates an example process flow of virtual reality based interactive learning on a VR display platform.

FIG. 5 illustrates an example embodiment of a process flow for virtual reality based interactive learning on a VR display platform. The VR-enabled device may be configured with a 'VR application' and associated software, hardware, and associated circuitry, that may be collectively configured for performing various VR based functions described in accordance with various embodiments herein. Said software, hardware, and associated circuitry may be collectively configured to host the VR application.

The VR application starts at 502, with one or more participants interacting with a virtual environment. At 504, a start screen module having an introductory 3D interactive scene is displayed to the participant. Further at 506, a start button is presented to the participant within the 3D interactive scene. The start button turns white when looked up by the participant, to indicate that the start button can now be triggered. When the start button is triggered through gestures or eye movements, the participant proceeds to a next module.

At 508, the participant enters an interactive learning module after the start button is triggered. The interactive learning module helps the participant to get acquainted with the virtual reality environment, as calibrating with the virtual world for first time is difficult.

In an embodiment, the interactive learning module 508 may be of Database-SQL which provides information regarding SQL and queries. The one or more participant is presented with multiple slides for reading. After the participant completes reading the slides, a sphere object is provided so that after staring at it for 0.5 seconds, the participant enters into auto walk mode and this process can get stopped by again staring at the sphere object. A separate button named 'click here' is present in the interactive learning module 508 which will take the participant to proceed to a quiz domain. After the participant completes reading all the slides, the click here button is activated and the participant can click on it through gestures or eye movements to proceed to take a quiz in the quiz domain.

At 510, the participant proceeds to the quiz domain after the interactive learning module is completed by the participant. A quiz in the quiz domain contains one or more queries based on the multiple slides presented to the participant in the interactive learning module. Each query presented during the quiz contains two options, the participant has to select the correct option so as to get points. For each correct answer, the participant will receive +5 points, and if the participant fails to answer the query no points are added. Also, a timer option having a time span of 10 seconds is enabled in the quiz itself. If the participant fails to answer the query within the time limit of 10 seconds then no points are added for that query and the participant will proceed to the defeat level at 514. If the participant gives the correct answer to the query, points are awarded and the participant proceeds to the win level at 512. After all the queries are answered by the participant in the quiz domain scores are displayed by a score module at 516. The scores displayed by the score module are indicative of the participant's learning.

Various methods and systems for VR based interactive learning disclosed herein facilitates learning by interaction of the participants with the VR interactive scenes simulated by the system. The system delivers collaborative learning by integrating learning and gaming into a single module.

Figure 6A:
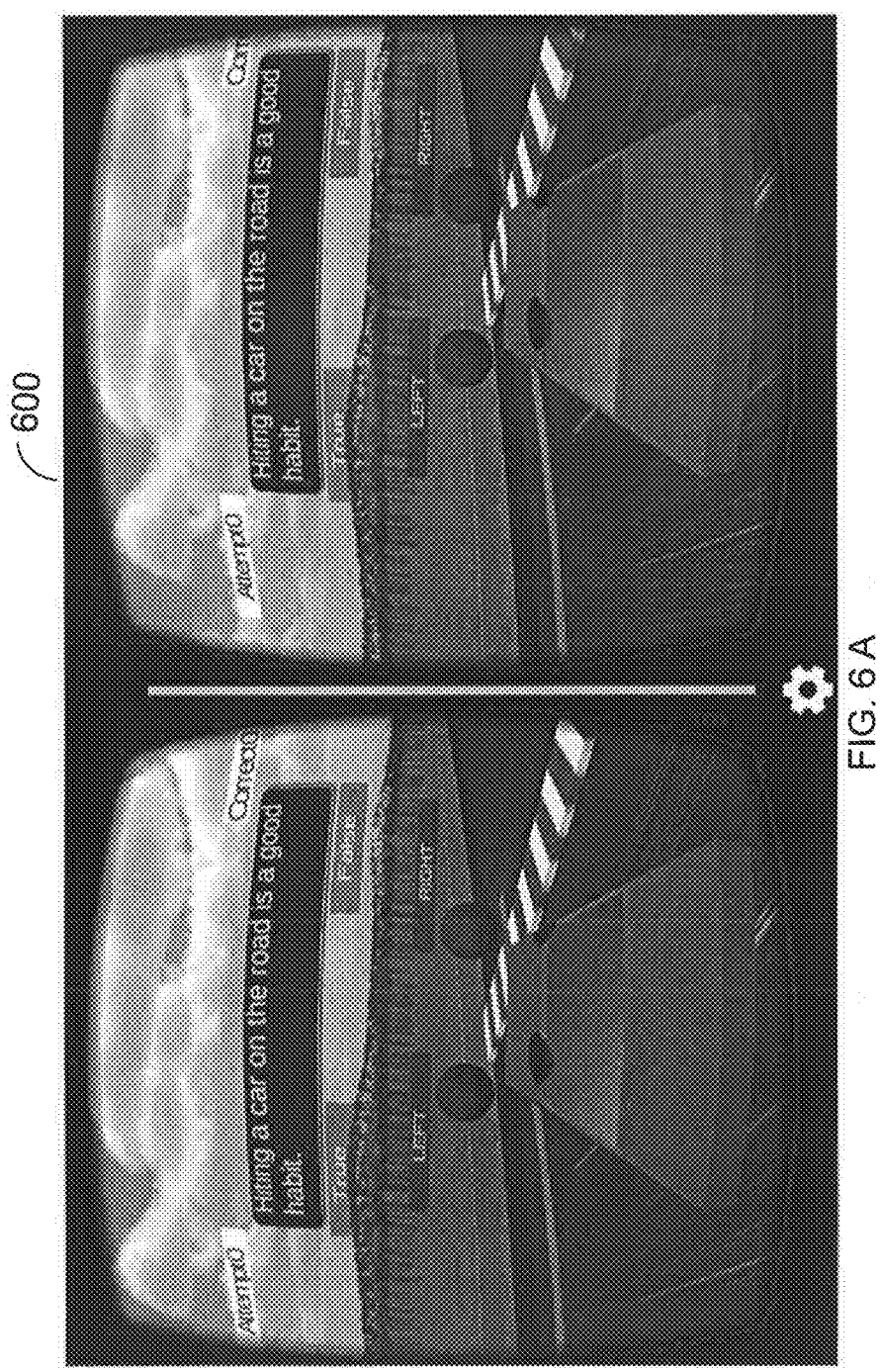
FIGS. 6A, 6B, and 6C illustrate representation of rendering of a VR based interactive learning in an example scenario, in accordance with an embodiment.
Figure 6B:
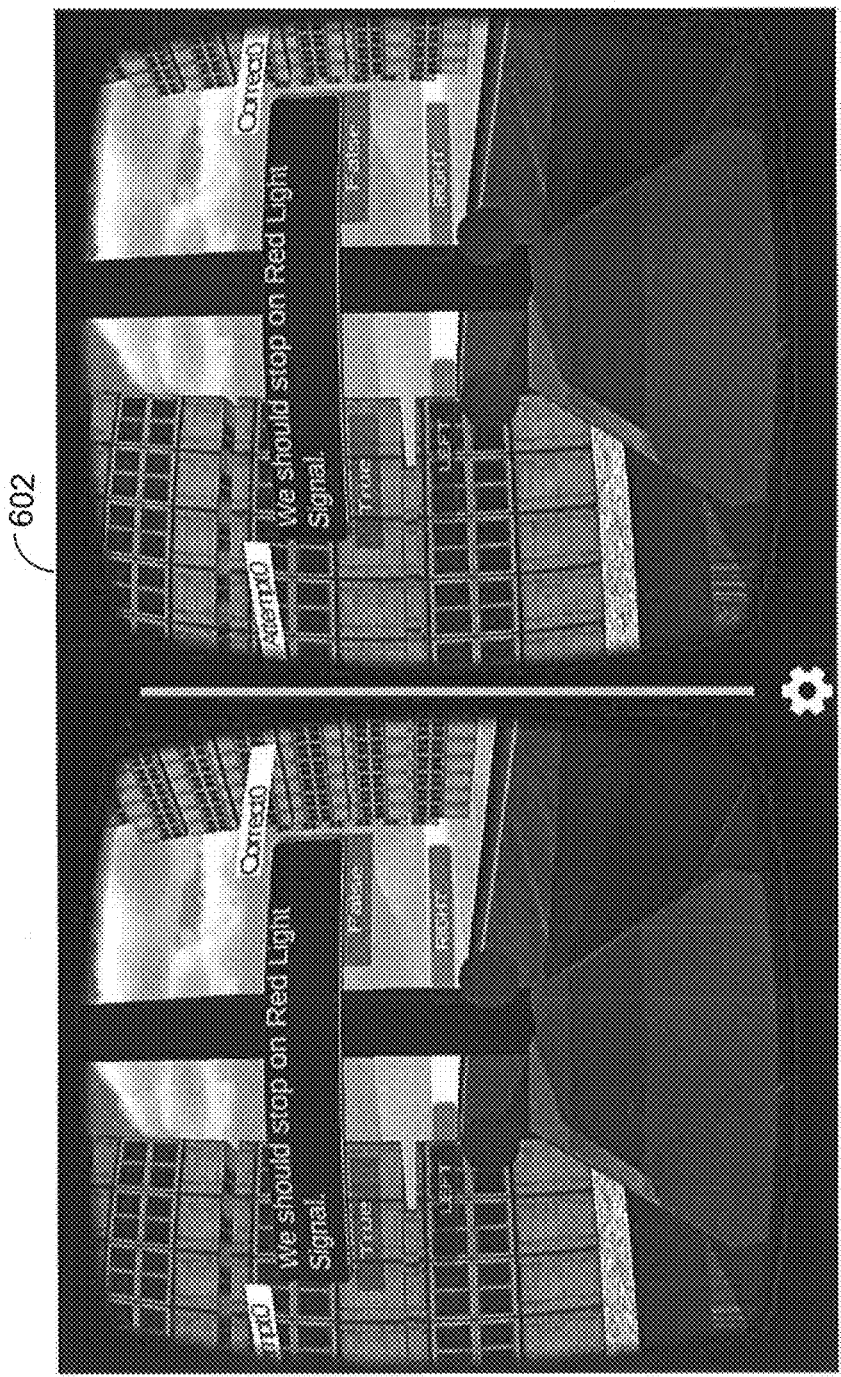
Figure 6C:
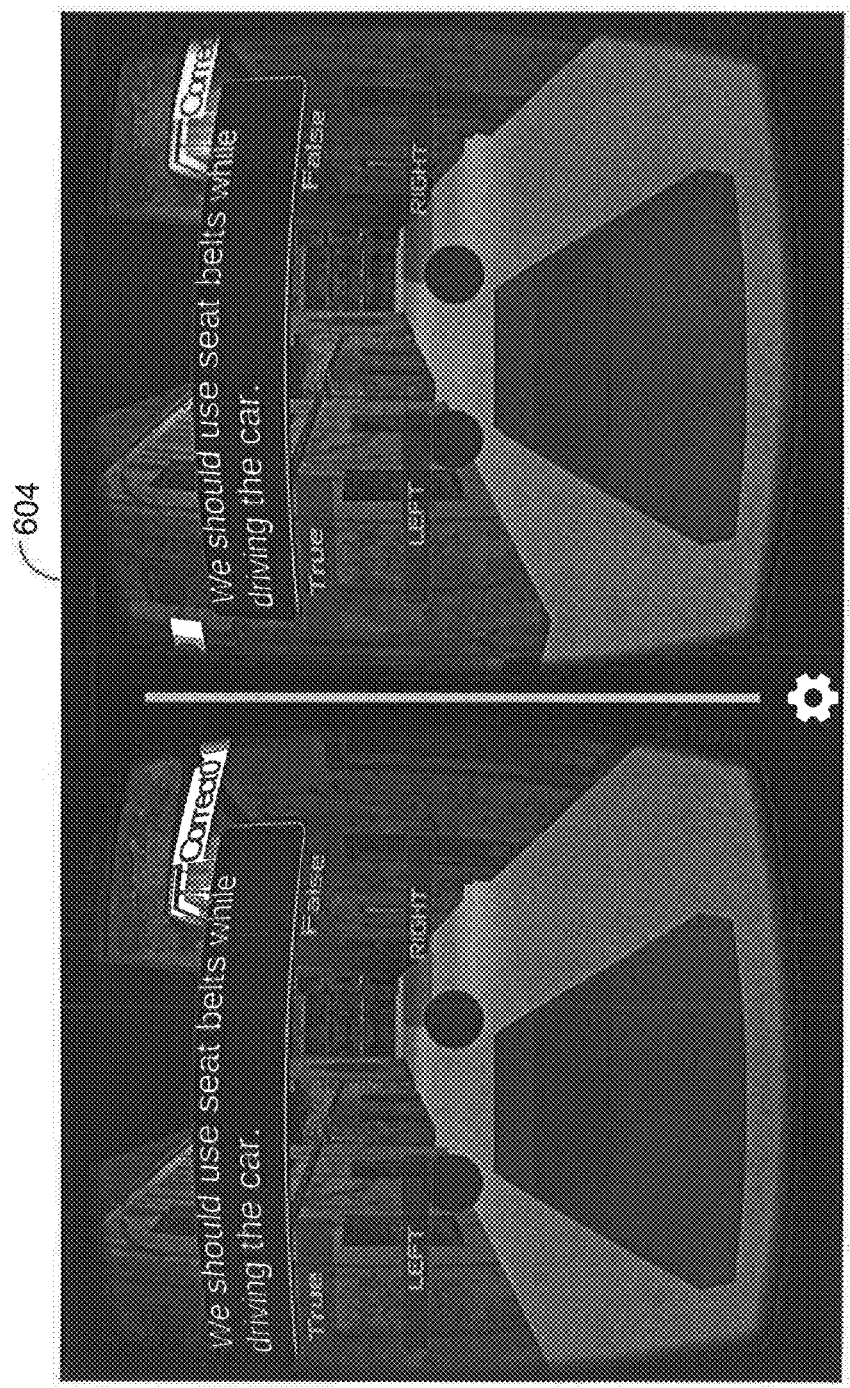

FIGS. 6A, 6B, and 6C illustrate representation of rendering of a VR based interactive learning in an example scenario, in accordance with an embodiment. In the present embodiment, a VR scene based on a traffic scenario is presented to a participant in a VR environment. The participant is provided with a simulated VR scene such that, the participant is driving a vehicle within the VR environment. While the participant is driving the vehicle in the VR environment various queries related to traffic rules pop up. The participant responds to the queries based on interaction with the VR environment which include movement, gesture, eye tracking and the like. According to the participant's responses the system assesses the participant. The system will then learn behavioral attributes of the participant based on the assessment of the driving pattern and would further provide VR environments dynamically based on the behavioral attributes learnt. Furthermore, the system will advise the participant on their strong and weak points along with providing the participant with information regarding various safety measures.

FIG. 6A, illustrates a virtual scene 600 in a VR environment, a participant is presented a query—"hitting a car on the road is a good habit". The participant responds to the query by turning left or right by movements or gestures or eye tracking. If the participant turns right, it indicates that the response of the participant is false and if the participant turns left it indicates that the response of the participant is true. Further, the system classifies the response of the participant as correct or attempt. This enables the system to learn behavioral attributes and knowledge levels of the participant. For instance, if the participant responds by turning right in the present VR scene, it is assessed by the system that the participant is aware of the basic traffic rules. Whereas, if the participant responds by turning left, it is assessed by the system that the participant is unaware of the basic traffic rules. Based on the response of the participant and the assessment by the system, a subsequent query and VR scene is dynamically rendered to the participant, by the system.

Similarly FIG. 6B, illustrates a virtual scene 602 in a VR environment, the participant is presented a query—"we should stop on red light signal". The participant responds to the query by turning left or right by movements or gestures or eye tracking. If the participant turns right, it indicates that the response of the participant is false and if the participant turns left it indicates that the response of the participant if true. Further the system, classifies the response of the participant as correct or attempt. This enables the system to learn behavioral attributes and knowledge levels of the participant. For instance, if the participant responds by turning right in the present VR scene, it is assessed by the system that the participant is unaware of the basic traffic rules. Whereas, if the participant responds by turning left, it is assessed by the system that the participant is aware of the basic traffic rules. Based on the response of the participant and the assessment by the system, a subsequent query and VR scene is dynamically rendered to the participant, by the system.

Similarly FIG. 6C, illustrates a virtual scene 604 in a VR environment, the participant is presented a query "we should use seat belts while driving the car". The participant responds to the query by turning left or right by movements or gestures or eye tracking. If the participant turns right, it indicates that the response of the participant is false and if the participant turns left it indicates that the response of the participant if true. Further the system, classifies the response of the participant as correct or attempt. This enables the system to learn behavioral attributes and knowledge levels of the participant. For instance, if the participant responds by turning right in the present VR scene, it is assessed by the system that the participant is unaware of the basic traffic rules. Whereas, if the participant responds by turning left, it is assessed by the system that the participant is aware of the basic traffic rules. Based on the response of the participant and the assessment by the system, a subsequent query and VR scene is dynamically rendered to the participant, by the system.

After the participant completes all the queries in a VR scene, a first cumulative assessment score is calculated by the system which would indicate the overall knowledge and learning of the participant. A threshold assessment score is pre-defined by the system, which enables the system to determine whether the participant moves on to a next level. If the first cumulative assessment score of the participant is equal to or above the threshold assessment score, it is determined by the system that the participant has the requisite knowledge in the domain of driving and traffic awareness in the present embodiment, and is allowed to move on to the next level. Whereas, if the first cumulative assessment score of the participant is below the threshold assessment score, it is determined by the system that the participant does not have the requisite knowledge to move on to the next level and the participant is asked to repeat the same level once again till the cumulative assessment score of the participant is equal to or more than the threshold score.

In another example embodiment, the virtual reality based interactive learning system may be used for various product demonstrations. Customers usually require support in case of new products. For instance, the present system may be used for a new banking product, where a participant is able to access and use the new banking product within the VR environment. This gives the participant an understanding of the new product which facilitates the participant in making a decision regarding buying or registering for the new product.

The VR based interactive learning system provides the participant to learn and assess a skill set based on the participant's learning. The system adapts to the learning of the participant and provides the participant a unique experience. The future experiences of the participant in the VR environment will be driven by the learning patterns derived from individual participants and reformed by the system.

In an embodiment, the virtual reality based interactive learning system may be used for conducting virtual examinations and assessments by implementing the examination system to the intelligent VR environment described with reference to various embodiments here. In such an embodiment, the examinations are scenario based and adaptive to participant's natural knowledge and cognitive skillset. In an instance, there may be two participants, for example, a participant1 and a participant2 attending an examination through the VR based interactive learning system. A plurality of queries can be presented to the participant1 during the examination. Herein, the queries can be in the form of yes/no questions, multiple choice questions, rate-assignment questions, or in any form, without limiting to conventional types of queries. The participant1 responds to the queries by interacting with the VR environment through movements or gestures or eye tracking. The plurality of queries presented to the participant1 are adaptive based on the performance of the participant1. Further, the VR environment adapts to the knowledge of the participant1. The participant2 attends the examination a week later than the participant1. The participant2 can also be presented with a different set of queries based on the learning of the system based on the VR environment.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented system executed by a computing device for learning in virtual reality (VR) environment, the system comprising:
    at least one hardware processor; and
    at least one memory storing Instructions and a repository, the repository comprising simulation data and one or more behavioral attributes indicative of one or more of performance parameters, past knowledge, and learning of two or more participants of the VR environment, the at least one memory coupled to the at least one hardware processor, wherein the at least one hardware processor configured by said instructions to:
    simulate a 3-dimensional (3D) interactive scene in the VR environment based on the simulation data, the 3D interactive scene representative of a real-world scene,
    render the 3D interactive scene on a VR display platform of the VR environment, the 3D interactive scene further comprising one or more queries associated with context of the 3D interactive scene;
    receive one or more responses to the one or more queries in the VR environment from the two or more participants of the VR environment,
    compute a first cumulative assessment score corresponding to the 3D interactive scene based on individual responses of the two or more participants, one or more responses based on an interaction among the two or more participants and the one or more behavioral attributes of the two or more participants,
    dynamically simulate one or more subsequent 3D interactive scenes with context that is preliminary to the context of the 3D interactive scene in the VR environment based on the first cumulative assessment score, the one or more subsequent 3D interactive scenes comprising one or more subsequent queries associated with context of the one or more subsequent scenes, wherein a difficulty level of the one or more subsequent queries is different from a difficulty level of the one or more queries and wherein the difficulty level of the one or more subsequent queries is less than the difficulty level of the one or more queries when the first cumulative assessment score is less than an expected value of a threshold score of the rendered 3D interactive scene,
    render the one or more subsequent 3D interactive scenes comprising the one or more subsequent queries on the VR display platform to receive one or more subsequent responses from the two or more participants, and
    compute a second cumulative assessment score based on the one or more subsequent responses and the one or more behavioral attributes of the two or more participants, wherein the second cumulative assessment score is indicative of learning and performance of the two or more participants in the one or more subsequent 3D interactive scenes, and
    compute an overall assessment score based at least on the first cumulative assessment score and the second cumulative assessment score of the 3D interactive scene and the one or more subsequent 3D interactive scenes, respectively, wherein the one or more subsequent 3D interactive scenes are rendered until the overall assessment score is less than a threshold assessment score, the threshold assessment score indicative of the learning and dynamically updated based on the performance of the two or more participants,
    learn the one or more behavioral attributes and knowledge levels of the two or more participants based on the overall assessment score and provide advice to improve learning of the two or more participants in accordance with the learned behavioral attributes and the knowledge levels.

2. The system as claimed in claim 1, wherein the at least one hardware processor is further configured by the instructions to:
    monitor the one or more responses to the one or more queries and the one or more subsequent queries, and
    update the simulation data based on the monitoring, wherein updating the simulation data comprises updating a selection of the one or more queries to be rendered with the 3D interactive scene and the one or more subsequent queries to be rendered with the subsequent 3D interactive scene.

3. The system as claimed in claim 1, wherein the two or more participants comprises a plurality of participants, the at least one hardware processor is further configured by the instructions to enable collaboration between the plurality of participants in the VR environment for providing response to the one or more queries and the one or more subsequent queries.

4. The system as claimed in claim 1, wherein the at least one hardware processor is further configured by the instructions to enable interaction of the two or more participants with the 3D interactive scene based on one or more gestures of the two or more participants.

5. The system as claimed in claim 4, wherein the interaction with the 3D interactive scene and the one or more subsequent 3D interactive scenes to respond to the one or more queries and the one more subsequent queries facilitates in the learning.

6. The system as claimed in claim 1, wherein the simulation data comprises a plurality of interactive scenes and a plurality of queries associated with the plurality of interactive scenes.

7. A computer-implemented method for learning in virtual reality (VR) environment, the method comprising:
    simulating, via one or more hardware processors, a 3D interactive scene in the VR environment based on the simulation data, the 3D interactive scene representative of a real-world scene;
    rendering, via the one or more hardware processors, the 3D interactive scene on a VR display platform of the VR environment, the 3D interactive scene further comprising one or more queries associated with context of the 3D interactive scene;

receiving, via the one or more hardware processors, one or more responses to the one or more queries in the VR environment from the two or more participants of the VR environment;

computing, via the one or more hardware processors, a first cumulative assessment score corresponding to the 3D interactive scene based on individual responses of the two or more participants, one or more responses based on an interaction among the two or more participants and the one or more behavioral attributes indicative of one or more of performance parameters, past knowledge, and learning of the two or more participants;

dynamically simulating, via the one or more hardware processors, one or more subsequent 3D interactive scenes with context that is preliminary to the context of the 3D interactive scene in the VR environment based on the first cumulative assessment score, the one or more subsequent 3D interactive scenes comprising one or more subsequent queries associated with context of the one or more subsequent scenes, wherein a difficulty level of the one or more subsequent queries is different from a difficulty level of the one or more queries and wherein the difficulty level of the one or more subsequent queries is less than the difficulty level of the one or more queries when the first cumulative assessment score is less than an expected value of a threshold score of the rendered 3D interactive scene;

rendering, via the one or more hardware processors, the one or more subsequent 3D interactive scenes comprising the one or more subsequent queries on the VR display platform to receive one or more subsequent responses from the two or more participants; and computing, via the one or more hardware processors, a second cumulative assessment score based on the one or more subsequent responses and the one or more behavioral attributes of the two or more participants, wherein the second cumulative assessment score is indicative of learning and performance of the two or more participants in the one or more subsequent 3D interactive scenes, and compute an overall assessment score based at least on the first cumulative assessment score and the second cumulative assessment score of the 3D interactive scene and the one or more subsequent 3D interactive scenes, respectively, wherein the one or more subsequent 3D interactive scenes are rendered until the overall assessment score is less than a threshold assessment score, the threshold assessment score indicative of the learning and dynamically updated based on the performance of the two or more participants, learning, via the one or more hardware processors, the one or more behavioral attributes and knowledge levels of the two or more participants based on the overall assessment score and provide advice to improve learning of the two or more participants in accordance with the learned behavioral attributes and the knowledge levels.

8. The method as claimed in claim 7, further comprising:
monitoring the one or more responses to the one or more queries and the one or more subsequent queries, and
updating the simulation data based on the monitoring, wherein updating the simulation data comprises updating a selection of the one or more queries to be rendered with the 3D interactive scene and the one or more subsequent queries to be rendered with the subsequent 3D interactive scene.

9. The method as claimed in claim 7,
wherein the two or more participants comprises a plurality of participants, the method further comprising enabling collaboration between the plurality of participants in the VR environment for providing response to the one or more queries arid the one or more subsequent queries.

10. The method as claimed in claim 7,
wherein the method further comprises enabling interaction of the two or more participants with the 3D interactive scene based on one or more gestures of the two or more participants.

11. The method as claimed in claim 7, wherein the interaction with the 3D interactive scene and the one or more subsequent 3D interactive scenes to respond to the one or more queries and the one more subsequent queries facilitates in the learning.

12. The method as claimed in claim 7, wherein the simulation data comprises a plurality of interactive scenes and a plurality of queries associated with the plurality of interactive scenes.

13. A non-transitory computer-readable medium having embodied thereon a computer program for executing a method comprising:
simulating a 3D interactive scene in the VR environment based on the simulation data, the 3D interactive scene representative of a real-world scene;
rendering the 3D interactive scene on a VR display platform of the VR environment, the 3D interactive scene further comprising one or more queries associated with context of the 3D interactive scene;
receiving one or more responses to the one or more queries in the VR environment from the two or more participants of the VR environment;
computing a first cumulative assessment score corresponding to the 3D interactive scene based on individual responses of the two or more participants, one or more responses based on an interaction among the two or more participants and the one or more behavioral attributes indicative of performance parameters, past knowledge and learning of the two or more participants;
dynamically simulating one or more subsequent 3D interactive scenes with context that is preliminary to the context of the 3D interactive scene in the VR environment based on the first cumulative assessment score, the one or more subsequent 3D interactive scenes comprising one or more subsequent queries associated with context of the one or more subsequent scenes, wherein a difficulty level of the one or more subsequent queries is different from a difficulty level of the one or more queries and wherein the difficulty level of the one or more subsequent queries is less than the difficulty level of the one or more queries when the first cumulative assessment score is less than an expected value of a threshold score of the rendered 3D interactive scene;
rendering the one or more subsequent 3D interactive scenes comprising the one or more subsequent queries on the VR display platform to receive one or more subsequent responses from the two or more participants; and
computing a second cumulative assessment score based on the one or more subsequent responses and the one or more behavioral attributes of the two or more participants, wherein the second cumulative assessment score is indicative of learning and performance of the two or more participants in the one or more subsequent 3D interactive scenes, and computing an overall assessment score based at least on the first cumulative assessment score and the second cumulative assessment score of the 3D interactive scene and the one or more subsequent 3D interactive scenes, respectively, wherein the one or more subsequent 3D interactive scenes are rendered until the overall assessment score is less than a threshold assessment score, the threshold assessment score indicative of the learning and dynamically updated based on the performance of the two or more participants, learning the one or more behavioral attributes and knowledge levels of the two or more participants based on the overall assessment score and provide advice to improve learning of the two or more participants in accordance with the learned behavioral attributes and the knowledge levels.

* * * * *